(12) United States Patent
Liu

(10) Patent No.: US 10,959,124 B2
(45) Date of Patent: Mar. 23, 2021

(54) UPLINK DATA TRANSMISSION METHOD, TERMINAL, NETWORK SIDE DEVICE AND SYSTEM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 21 days.

(21) Appl. No.: 16/475,350

(22) PCT Filed: Mar. 23, 2017

(86) PCT No.: PCT/CN2017/077867
§ 371 (c)(1),
(2) Date: Jul. 1, 2019

(87) PCT Pub. No.: WO2018/170833
PCT Pub. Date: Sep. 27, 2018

(65) Prior Publication Data
US 2019/0313278 A1    Oct. 10, 2019

(51) Int. Cl.
*H04W 28/02* (2009.01)
*H04W 76/27* (2018.01)
(Continued)

(52) U.S. Cl.
CPC ....... *H04W 28/0268* (2013.01); *H04L 1/1642* (2013.01); *H04W 76/27* (2018.02); *H04W 80/08* (2013.01)

(58) Field of Classification Search
CPC . H04W 28/0268; H04W 76/27; H04W 80/08; H04W 76/11; H04W 80/02; H04L 1/1642
See application file for complete search history.

(56) References Cited

U.S. PATENT DOCUMENTS

2016/0359750 A1   12/2016   Miklos et al.
2018/0213540 A1*   7/2018   Chiu .................. H04L 69/22

FOREIGN PATENT DOCUMENTS

CN      102026398      4/2011
CN      103634893      3/2014
(Continued)

OTHER PUBLICATIONS

NTT Docomo, Inc., "TR 38.804 v0.8.0 on Study on New Radio Access Technology; Radio Interface Protocol Aspects", 3GPP TSG-RAN WG2 #97, Mar. 2017, pp. 24 and 29-30.
(Continued)

*Primary Examiner* — Afshawn M Towfighi
(74) *Attorney, Agent, or Firm* — Hodgson Russ LLP

(57) ABSTRACT

An uplink data transmission method includes: transmitting uplink data by a terminal, wherein a packet data convergence protocol (PDCP) serial number (SN) of each data packet in the uplink data corresponds to a quality of service
(Continued)

flow identifier (QoS flow ID) in a pre-set mapping relationship. The embodiments of the present invention are favourable for reducing the overheads of a QoS flow ID of uplink data and improving the transmission efficiency of the uplink data.

12 Claims, 6 Drawing Sheets

(51) Int. Cl.
*H04L 1/16* (2006.01)
*H04W 80/08* (2009.01)

(56) References Cited

FOREIGN PATENT DOCUMENTS

| | | |
|---|---|---|
| CN | 104683262 | 6/2015 |
| CN | 104735728 | 6/2015 |
| CN | 105432135 | 3/2016 |
| CN | 105813213 | 7/2016 |
| CN | 106332048 | 1/2017 |
| CN | 106357548 | 1/2017 |
| CN | 106453138 | 2/2017 |
| EP | 3355641 | 8/2018 |
| WO | 2014074037 | 5/2014 |
| WO | 2016191963 | 12/2016 |

OTHER PUBLICATIONS

NTT Docomo, Inc., "TR 38.804 v0.7.1 on Study on New Radio Access Technology; Radio Interface Protocol Aspects", 3GPP TSG-RAN WG2 #97, Mar. 2017, 62 pages.

NTT Docomo, Inc., "[97#53] [NR] RAN2/3 part of Text Proposal to TR 38.912", 3GPP TSG-RAN WG2 #97, Mar. 2017, 74 pages.

WIPO, ISR for PCT/CN2017/077867, Dec. 22, 2017.

Ericsson, "QoS framework for NR," 3GPP TSG-RAN WG2 #97, Tdoc R2-1700842, Feb. 2017, 6 pages.

Intel Corporation et al., "End marker with last SN for handling PDCP key change," 3GPP TSG RAN WG2 Meeting #96, R2-168574, Nov. 2016, 8 pages.

ZTE et al., "Further discussion on the new UP protocol layer for QoS," 3GPP TSG-RAN WG2 Meeting #97, R2-1701119, Feb. 2017, 7 pages.

EPO, Office Action for EP Application No. 17902349.4, dated Nov. 25, 2019.

CNIPA, First Office Action for CN Application No. 201780075282.3, dated Nov. 28, 2019.

SIPO, Notification to Grant Patent Right for CN Application No. 201780075282.3, dated Feb. 28, 2020.

EPO, Office Action for EP Application No. 17902349.4, dated Aug. 10, 2020.

\* cited by examiner

Transmit uplink data by the terminal, wherein, packet data convergence protocol sequence number (PDCP SN) of each data packet in the uplink data corresponds to a quality of service flow identification (QoS flow ID) in preset mapping relationship  /401

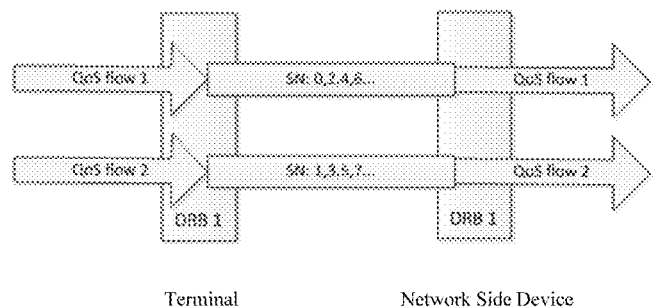
FIG. 4B
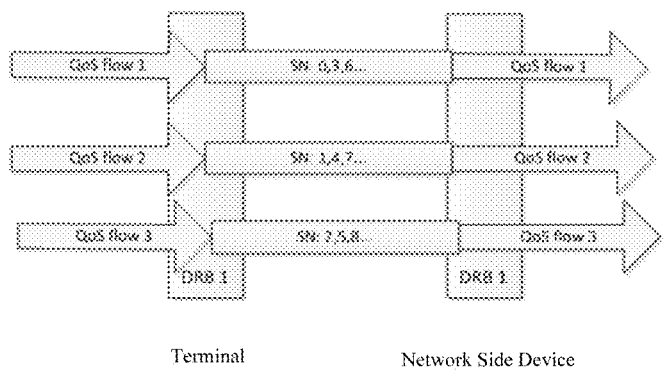
FIG. 4C
receive an uplink data by the network side device, wherein, packet data convergence protocol sequence number (PDCP SN) of each data packet in the uplink data corresponds to a quality of service flow identification (QoS flow ID) in preset mapping relationship /501
FIG. 5

UPLINK DATA TRANSMISSION METHOD, TERMINAL, NETWORK SIDE DEVICE AND SYSTEM

CROSS-REFERENCE TO RELATED APPLICATION

This application is a U.S. national phase application of International Application No. PCT/CN2017/077867, filed Mar. 23, 2017, the entire disclosure of which is incorporated herein by reference.

TECHNICAL FIELD

The present disclosure relates to the field of communication technologies, and more particularly, to an uplink transmission method, a terminal, a network side device and a system.

BACKGROUND

QoS (Quality of Service) is quality of service. For network business, the quality of service includes bandwidth of transmission, delay of transmission, and packet loss rate of data. In the network, the quality of service can be improved by ensuring the bandwidth of transmission, reducing the delay of transmission and reducing the packet loss rate of data and delay jitter. Network resources are always limited, as long as there is a situation of robbing network resources, there will be requirements for the quality of service. The quality of service is relative to the network service. When the service quality of a certain type of service is guaranteed, it may damage the service quality of other services. For example, if the total bandwidth of a network is fixed, the more bandwidth a certain type of service occupies, the less bandwidth that other services can use, which may affect the use of other services. Therefore, network managers need to rationally plan and allocate network resources according to the characteristics of various services, so that network resources can be efficiently utilized.

The QoS of the 5th-Generation (5G) new radio (NR) mainly includes two parts, non-access stratum mapping (NAS mapping) and access stratum mapping (AS mapping), which includes a process of mapping data packets from Internet protocol (IP flow) to QoS flow, and mapping QoS flow to data radio bear (DRB). As shown in FIG. 1, according to the latest development of the 3rd Generation Partnership Project (3GPP) conference, the QoS of the 5G NR needs to establish a protocol data unit session (PDU session), the PDU session contains the QoS flow mapped by multiple IP flow, and packets in each QoS flow carry the QoS flow identification (QoS flow ID). For the uplink data, the mapping of the QoS flow to the DRB is determined according to the downlink data mapping rule, and each packet needs to carry the QoS flow ID to complete the mapping. For the uplink data, the mapping from the DRB to the QoS flow at the receiving end needs to be judged according to the QoS flow ID. This requires the QoS flow ID carried on each packet. However, the QoS flow ID carried on each packet obviously increases the extra resource waste.

SUMMARY

Embodiments of the present disclosure provide an uplink data transmission method, a terminal, a network side device, and a system, so as to reduce the overhead of the QoS flow ID of the uplink data and improve the uplink data transmission efficiency.

In the first aspect, an embodiment of the present disclosure provides an uplink data transmission method, including:

transmitting uplink data by a terminal, wherein, packet data convergence protocol sequence number (PDCP SN) of each data packet in the uplink data corresponds to a quality of service flow identification (QoS flow ID) in preset mapping relationship.

In a possible embodiment, the preset mapping relationship is a correspondence between the PDCP SN and the QoS flow ID, and data in the data packet identified by the PDCP SN is derived from QoS flow identified by the QoS flow ID corresponding to the PDCP SN.

In a possible embodiment, the QoS flow identified by the QoS flow ID in the preset mapping relationship is the QoS flow of the DRB mapped to the terminal.

In a possible embodiment, the preset mapping relationship is determined by:

a reflective mapping of QoS; or a flow mapping indicated by radio resource control (RRC) signaling.

In a possible embodiment, the method further includes:

obtaining, by the terminal, from an access stratum (AS) entity through a PDCP stratum entity, the QoS flow ID of the QoS flow of the DRB mapped to the terminal; and establishing, by the terminal, a correspondence between the PDCP SN of the data packet and the QoS flow ID to form the preset mapping relationship.

In a possible embodiment, the method further includes details as follows.

transmitting, by the terminal, the preset mapping relationship through RRC signaling.

In a second aspect, an embodiment of the present disclosure provides an uplink data transmission method, including:

receiving an uplink data by a network side device, wherein, packet data convergence protocol sequence number (PDCP SN) of each data packet in the uplink data corresponds to a quality of service flow identification (QoS flow ID) in preset mapping relationship.

In a possible embodiment, the preset mapping relationship is a correspondence between the PDCP SN and the QoS flow ID, and data in the data packet identified by the PDCP SN is derived from QoS flow identified by the QoS flow ID corresponding to the PDCP SN.

In a possible embodiment, the QoS flow identified by the QoS flow ID in the preset mapping relationship is the QoS flow of data radio bear (DRB) mapped to the terminal.

In a possible embodiment, the preset mapping relationship is determined by:

a reflective mapping of QoS; or a flow mapping indicated by radio resource control (RRC) signaling.

In a possible embodiment, the method further includes details as follows.

obtaining, by the network side device, the PDCP SN from a PDCP stratum entity through an access stratum (AS) entity; and querying, by the network side device, the preset mapping relationship using the PDCP SN as a query identifier, to determine the QoS flow ID corresponding to the PDCP SN.

In a possible embodiment, the method further includes details as follows.

receiving, by the network side device, the preset mapping relationship through RRC signaling.

In a third aspect, an embodiment of the present disclosure provides a terminal, wherein the terminal has a function of implementing behavior of the terminal in the foregoing method design. The functions may be implemented by hardware or by corresponding software implemented by hardware. The hardware or software includes one or more modules corresponding to the functions described above.

In a possible embodiment, the terminal includes a processor configured to support the terminal in performing the corresponding functions of the above methods. Further, the terminal may further include a transceiver for supporting communication between the terminal and the network side device. Further, the terminal may further include a memory for coupling with the processor, which stores program instructions and data necessary for the terminal.

In a fourth aspect, an embodiment of the present disclosure provides a network side device, wherein the network side device has a function of implementing behavior of the network side device in the foregoing method design. The functions may be implemented by hardware or by corresponding software implemented by hardware. The hardware or software includes one or more modules corresponding to the functions described above.

In a possible embodiment, the network side device includes a processor configured to support the network side device in performing the corresponding functions of the above methods. Further, the network side device may further include a transceiver for supporting communication between the terminal and the network side device. Further, the network side device may further include a memory for coupling with the processor, which stores program instructions and data necessary for the network side device.

In a fifth aspect, an embodiment of the present disclosure provides a communication system, wherein the system includes the terminal and the network side device described in the foregoing aspect.

In a sixth aspect, an embodiment of the present disclosure provides a computer readable storage medium, wherein the computer readable storage medium stores instructions, when it is executed on a computer, the computer is caused to perform the above first aspect or the second aspect method.

In a seventh aspect, an embodiment of the present disclosure provides a computer program product including instructions, when it is executed on a computer, the computer is caused to perform the above first or the second aspect method.

BRIEF DESCRIPTION OF THE DRAWINGS

The drawings used in the embodiments or the description of the prior art will be briefly introduced below.

FIG. 4B is a schematic diagram illustrating a preset mapping relationship according to an embodiment of the present disclosure;

FIG. 4C is a schematic diagram illustrating another preset mapping relationship according to an embodiment of the present disclosure;

FIG. 5 is a schematic diagram illustrating communication of another uplink data transmission method according to an embodiment of the present disclosure;

DETAILED DESCRIPTION

The technical solutions in the embodiments of the present disclosure will be described below with reference to the accompanying drawings.

Figure 1:
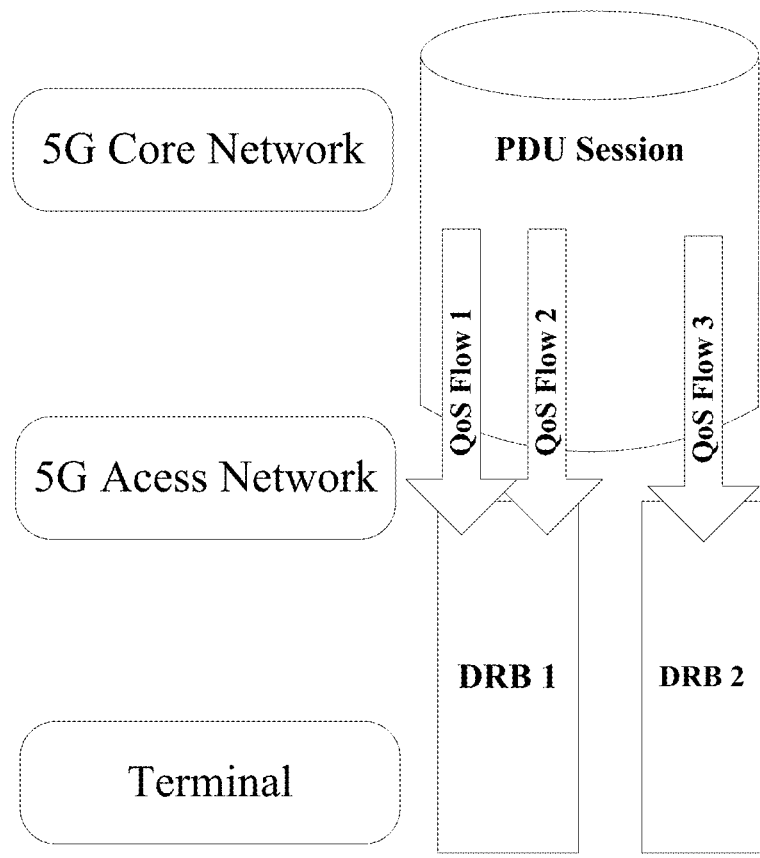
FIG. 1 is a schematic diagram illustrating a PDU session established by QoS of a 5G NR.
Figure 2:
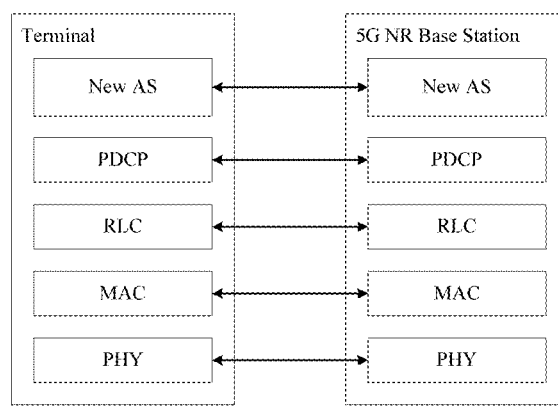
FIG. 2 is a block diagram illustrating a protocol stack of a 5G NR.

As shown in FIG. 2, the access stratum (AS) of the 5G NR is used to complete the mapping from the QoS flow to the DRB according to the corresponding QoS flow ID. The AS mainly includes the following three functions: (1) the QoS flow routing to the DRB; (2) the QoS flow ID encapsulation in downlink data; (3) the QoS flow ID encapsulation in uplink data.

Figures 3, 4A:
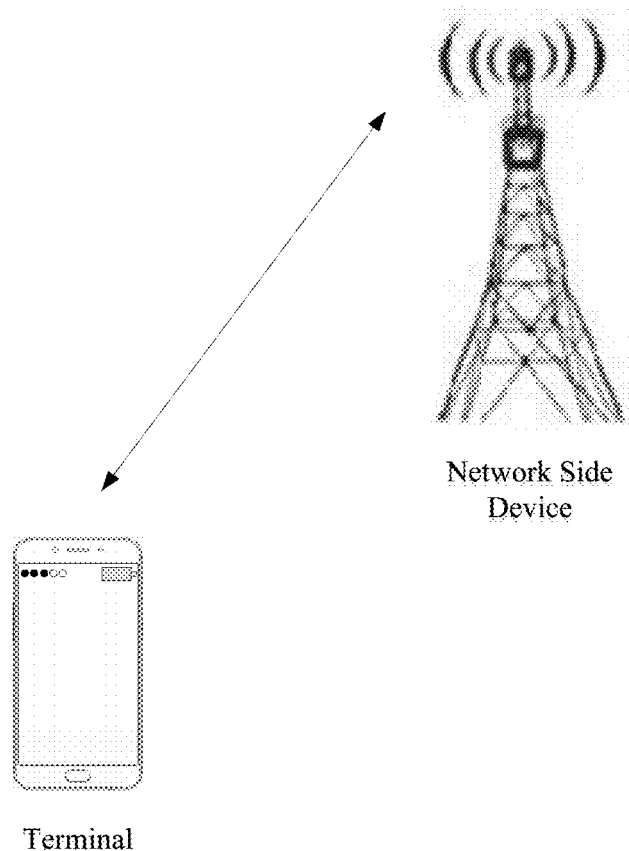
FIG. 3 is a schematic diagram illustrating network architecture of an exemplary mobile communication system according to an embodiment of the present disclosure.
FIG. 4A is a schematic diagram illustrating communication of an uplink data transmission method according to an embodiment of the present disclosure.

Referring to FIG. 3, FIG. 3 is a schematic diagram illustrating network architecture of an exemplary mobile communication system according to an embodiment of the present disclosure. The network architecture includes a network side device and a terminal. When the terminal accesses the mobile communication network provided by the network side device, the terminal and the network side device can communicate through the wireless link. The mobile communication system may be, for example, a 5G NR mobile communication system or the like. The network side device may be, for example, a base station in 5G network. In embodiments of the present disclosure, the terms "network" and "system" are often used interchangeably, and those skilled in the art can understand the meaning thereof. The terminal involved in the embodiments of the present disclosure may include various handheld devices, in-vehicle devices, wearable devices, computing devices, or other processing devices connected to the wireless modem, and various forms of user equipment (UE), mobile station (MS), terminal device and the like. For convenience of description, the devices mentioned above are collectively referred to as terminals.

Referring to FIG. 4A, FIG. 4A is a schematic diagram illustrating communication of an uplink data transmission method according to an embodiment of the present disclosure. The method includes part 401, which is specifically described as follows.

In the part 401, the terminal transmits the uplink data, wherein, packet data convergence protocol sequence number (PDCP SN) of each data packet in the uplink data corresponds to a quality of service flow identification (QoS flow ID) in preset mapping relationship.

For example, if the QoS flow of the DRB1 mapped to the terminal includes QoS flow 1 and QoS flow 2, the preset mapping relationship between the PDCP SN and the QoS flow ID of the data packet transmitted on the DRB1 may be as shown in FIG. 4B, the details are described as follows.

PDCP SN 0, PDCP SN 2, PDCP SN 4 . . . PDCP SN 2N corresponds to the QoS flow 1.

PDCP SN 1, PDCP SN 3, PDCP SN 5 . . . PDCP SN 2N-1 corresponds to the QoS flow 1, N is a positive integer.

For example, if the QoS flow of the DRB1 mapped to the terminal includes QoS flow 1, QoS flow 2 and QoS flow 3, the preset mapping relationship between the PDCP SN and the QoS flow ID of the data packet transmitted on the DRB1 may be as shown in FIG. 4C, the details are described as follows.

PDCP SN 0, PDCP SN 3, PDCP SN 6 . . . PDCP SN 3N corresponds to the QoS flow 1.

PDCP SN 1, PDCP SN 4, PDCP SN 7 . . . PDCP SN 3N-2 corresponds to the QoS flow 1.

PDCP SN 2, PDCP SN 5, PDCP SN 8 . . . PDCP SN 3N-1 corresponds to the QoS flow 1, N is a positive integer.

It can be seen that, in the embodiment of the present disclosure, since the preset mapping relationship includes the correspondence between the PDCP SN and the QoS flow ID of the data packet of the uplink data, the transmitted data packet does not need to carry the QoS flow ID, the terminal and the network side device only need to query the preset mapping relationship by using the PDCP SN of the data packet as a query identifier to query the preset mapping relationship, so as to know which QoS flow the data in the data packet comes from, thereby reducing the overhead of the QoS flow ID of the uplink data, which is beneficial to improve the efficiency of uplink data transmission.

In one possible example, the preset mapping relationship is a correspondence between the PDCP SN and the QoS flow ID, and data in the data packet identified by the PDCP SN is derived from QoS flow identified by the QoS flow ID corresponding to the PDCP SN.

In one possible example, the QoS flow identified by the QoS flow ID in the preset mapping relationship is the QoS flow of the DRB mapped to the terminal.

Wherein, the DRB is used to carry the user plane data. According to the QoS, the terminal and the network side device can simultaneously establish up to eight DRBs. The DRB of the terminal corresponds to the PDCP stratum entity of the terminal. The terminal may correspond to a plurality PDCP stratum entities, e.g., 8 PDCP stratum entities, and may correspondingly support 8 DRBs. When the QoS flow of different service data on the network side is transmitted, the network side device maps the QoS flow of the different service data to the DRB. For example, the QoS flow of the WeChat service of the terminal is mapped to the first DRB of the terminal, and the QoS flow of the video service of the terminal is mapped to the first DRB or the second DRB.

In one possible example, the preset mapping relationship is determined by following manners.

It may be determined by the reflective mapping of the QoS.

Or, it may be determined by the flow mapping indicated by the radio resource control (RRC) signaling.

Wherein, for the two data packets transmitted on the same DRB, the preset mapping relationship used by the latter data packet may be determined according to the mapping relationship used by the previous data packet. If the previous data packet corresponds to use the mapping relationship determined by the reflective mapping, the latter data packet also corresponds to use the mapping relationship determined by the reflective mapping. If the previous data packet corresponds to use the mapping relationship determined by the flow mapping indicated by the RRC signal, the latter data packet also corresponds to use the mapping relationship determined by the flow mapping indicated by RRC signaling.

In one possible example, the method further includes:

obtaining, by the terminal, from an access stratum (AS) entity through a PDCP stratum entity, the QoS flow ID of the QoS flow of the DRB mapped to the terminal; and establishing, by the terminal, a correspondence between the PDCP SN of the data packet and the QoS flow ID to form the preset mapping relationship.

Wherein, the QoS flow ID is on the terminal side and is visible to the PDCP stratum entity of the terminal. In a specific implementation, an interface may be preset between the AS entity and the PDCP entity, so that the PDCP entity can obtain the QoS flow ID directly from the AS entity through the interface.

It can be seen that, in this example, since the PDCP stratum can directly obtain the QoS flow ID of the QoS flow of the DRB mapped to the terminal from the AS entity, and since the PDCP SN of the data packet is directly configured by the PDCP entity, the PDCP entity can establish a correspondence between the PDCP SN of the data packet and the QoS flow ID to form the preset mapping relationship in real time, so that the case, that the PDCP entity can't obtain the QoS flow ID of the AS entity in time and cause the data packet transmission delay, can be avoided, which is beneficial to improve the transmission efficiency of the data packet.

In one possible example, the method further includes:

transmitting, by the terminal, the preset mapping relationship through RRC signaling.

Referring to FIG. 5, FIG. 5 is a schematic diagram illustrating communication of another uplink data transmission method according to an embodiment of the present disclosure. The method includes part 501, which is specifically described as follows.

In the part 501, the network side device receives an uplink data, wherein, packet data convergence protocol sequence number (PDCP SN) of each data packet in the uplink data corresponds to a quality of service flow identification (QoS flow ID) in preset mapping relationship.

It can be seen that, in the embodiment of the present disclosure, since the preset mapping relationship includes the correspondence between the PDCP SN and the QoS flow ID of the data packet of the uplink data, the transmitted data packet does not need to carry the QoS flow ID, the network side device only need to query the preset mapping relationship by using the PDCP SN of the data packet as a query identifier to query the preset mapping relationship, so as to know which QoS flow the data in the data packet comes from, thereby reducing the overhead of the QoS flow ID of the uplink data, which is beneficial to improve the efficiency of uplink data transmission.

In a possible embodiment, the preset mapping relationship is a correspondence between the PDCP SN and the QoS flow ID, and data in the data packet identified by the PDCP SN is derived from QoS flow identified by the QoS flow ID corresponding to the PDCP SN.

In a possible embodiment, the QoS flow identified by the QoS flow ID in the preset mapping relationship is the QoS flow of DRB mapped to the terminal.

In a possible embodiment, the preset mapping relationship is determined by following manners.

It may be determined by the reflective mapping of the QoS.

Or, It may be determined by the flow mapping indicated by the RRC signaling.

In a possible embodiment, the method further includes:
obtaining, by the network side device, the PDCP SN from a PDCP stratum entity through an access stratum (AS) entity; and querying, by the network side device, the preset mapping relationship using the PDCP SN as a query identifier, to determine the QoS flow ID corresponding to the PDCP SN.

Wherein, the PDCP SN is visible on the network side for the PDCP stratum entity of the network side device.

In one possible example, the method further includes:
receiving, by the network side device, the preset mapping relationship through RRC signaling.

The scheme of the embodiment of the disclosure is mainly introduced from the perspective of interaction between various network elements. It can be understood that the terminal and the network side device include corresponding hardware structures and/or software modules for performing the respective functions in order to implement the above functions. Those skilled in the art will readily appreciate that the present disclosure can be implemented in the form of hardware or a combination of hardware and computer software in combination with units and algorithm steps of various examples described in the embodiments disclosed herein. Whether a function is implemented in hardware or computer software to drive hardware depends on the specific application and design constraints of the solution. A person skilled in the art can use different methods for implementing the described functions for each particular application, but such implementation should not be considered to be beyond the scope of the present disclosure.

The embodiments of the present disclosure may perform the division of functional units on the terminal and the network side device according to the foregoing method. For example, each functional unit may be divided according to each function, or two or more functions may be integrated into one processing unit. The above integrated unit can be implemented in the form of hardware or in the form of a software functional unit. It should be noted that the division of the unit in the embodiment of the present disclosure is schematic, and is only a logical function division, and the actual implementation may have another division manner.

Figure 6A:
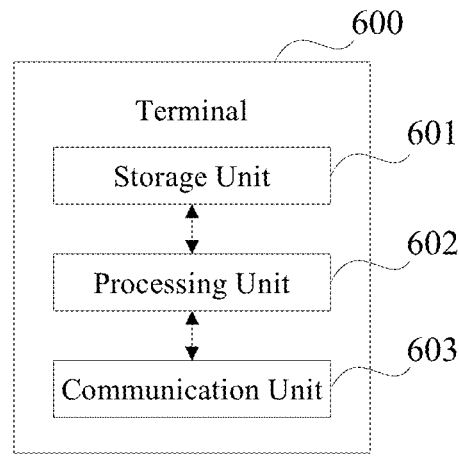
FIG. 6A is a block diagram illustrating a terminal according to an embodiment of the present disclosure.

In the case of adopting an integrated unit, FIG. 6A shows a possible structural diagram of the first core network device involved in the above embodiment. The terminal 600 includes a processing unit 602 and a communication unit 603. The processing unit 602 is configured to control and manage the actions of the terminal. For example, the processing unit 602 is configured to support the terminal to perform step 401 in FIG. 4A and/or other processes for the techniques described herein. The communication unit 603 is for supporting communication between the terminal and other devices, such as communication with the network side device shown in FIG. 3. The terminal may further include a storage unit 601 for storing program codes and data of the terminal.

Wherein, the processing unit 602 can be a processor or a controller, and can be, for example, a Central Processing Unit (CPU), a general-purpose processor, a Digital Signal Processor (DSP), an Application-specific Integrated Circuit (ASIC), Field Programmable it) Gate Array (FPGA) or other programmable logic device, transistor logic device, hardware component, or any combination thereof. It is possible to implement or carry out the various illustrative logical blocks, modules and circuits described in connection with the present disclosure. The processor may also be a combination of computing functions, for example, a combination including one or more microprocessors, a combination of a DSP and a microprocessor, and the like. The communication unit 603 may be a transceiver, a transceiver circuit, or the like, and the storage unit 601 may be a memory.

Wherein, the processing unit 602 is configured to transmit uplink data by using the communication unit 603, wherein packet data convergence protocol sequence number (PDCP SN) of each data packet in the uplink data corresponds to a quality of QoS flow ID in preset mapping relationship.

In a possible example, the preset mapping relationship is a correspondence between the PDCP SN and the QoS flow ID, and data in the data packet identified by the PDCP SN is derived from QoS flow identified by the QoS flow ID corresponding to the PDCP SN.

In a possible example, the QoS flow identified by the QoS flow ID in the preset mapping relationship is the QoS flow of DRB mapped to the terminal.

In a possible example, the preset mapping relationship is determined by following manners.

It may be determined by the reflective mapping of the QoS.

Or, it may be determined by the flow mapping indicated by the RRC signaling.

In a possible example, the processing unit 602 is configured to obtain, by means of the communication unit 603, from the AS entity through the PDCP stratum entity, the QoS flow ID of the QoS flow of the DRB mapped to the terminal, and establish a correspondence between the PDCP SN of the data packet and the QoS flow ID to form the preset mapping relationship.

In a possible example, the processing unit 602 is configured to transmit, by means of the communication unit 603, the preset mapping relationship through the RRC signaling.

When the processing unit 602 is a processor, the communication unit 603 is a communication interface, and the storage unit 601 is a memory, the terminal, involved in the embodiment of the present disclosure, may be the terminal shown in FIG. 4AB.

Figure 6B:
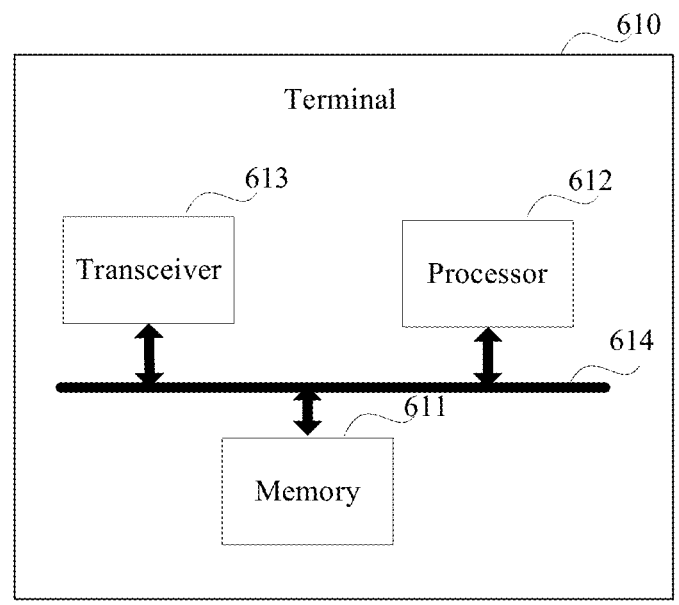
FIG. 6B is a block diagram illustrating another terminal according to an embodiment of the present disclosure.

Referring to FIG. 6B, the terminal 610 includes a processor 612, a communication interface 613, and a memory 611. Optionally, the terminal 610 may further include a bus 614. The communication interface 613, the processor 612 and the memory 611 may be connected to each other through a bus 614. The bus 614 may be a Peripheral Component Interconnect (PCI) bus or an Extended Industry Standard Architecture (EISA) bus and so on. The bus 614 can be categorized into an address bus, a data bus, a control bus and the like. For ease of representation, only one thick line is shown in FIG. 6B, but it does not mean that there is only one bus or one type of bus.

The terminal shown in FIG. 6A or FIG. 6B can also be understood as a device for the terminal, which is not limited in the embodiment of the present disclosure.

Figure 7A:
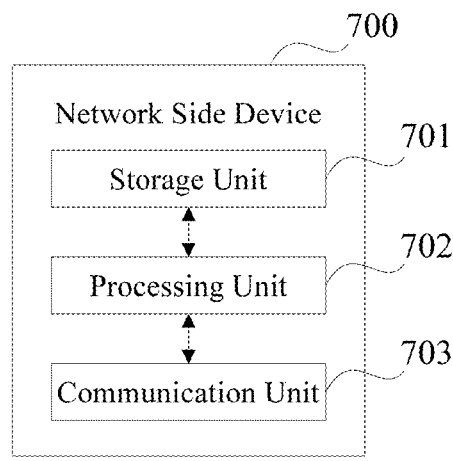
FIG. 7A is a block diagram illustrating a network side device according to an embodiment of the present disclosure.

In the case of adopting an integrated unit, FIG. 7A shows a possible structural diagram of the first core network device involved in the above embodiment. The network side device 700 includes a processing unit 702 and a communication unit 703. The processing unit 702 is configured to control and manage the actions of the network side device. For example, the processing unit 702 is configured to support the network side device to perform step 402 in FIG. 4A, step 501 in FIG. 4B, step 602 in FIG. 4C and/or other processes for the techniques described herein. The communication unit 703 is for supporting communication between the network side device and other devices, such as communication with the terminal shown in FIG. 3. The network side device may further include a storage unit 701 for storing program codes and data of the network side device.

Wherein, the processing unit 702 can be a processor or a controller, and can be, for example, a Central Processing Unit (CPU), a general-purpose processor, a Digital Signal Processor (DSP), an Application-specific Integrated Circuit (ASIC), Field Programmable Gate Array (FPGA) or other programmable logic device, transistor logic device, hardware component, or any combination thereof. It is possible to implement or carry out the various illustrative logical blocks, modules and circuits described in connection with the present disclosure. The processor may also be a combination of computing functions, for example, a combination including one or more microprocessors, a combination of a DSP and a microprocessor, and the like. The communication unit 703 may be a transceiver, a transceiver circuit, or the like, and the storage unit 701 may be a memory.

Wherein, the processing unit 702 is configured to transmit uplink data by means of the communication unit 703, wherein packet data convergence protocol sequence number (PDCP SN) of each data packet in the uplink data corresponds to a quality of QoS flow ID in preset mapping relationship.

In a possible example, the preset mapping relationship is a correspondence between the PDCP SN and the QoS flow ID, and data in the data packet identified by the PDCP SN is derived from QoS flow identified by the QoS flow ID corresponding to the PDCP SN.

In a possible example, the QoS flow identified by the QoS flow ID in the preset mapping relationship is the QoS flow of DRB mapped to the terminal.

In a possible example, the preset mapping relationship is determined by following manners.

It may be determined by the reflective mapping of the QoS.

Or, It may be determined by the flow mapping indicated by the RRC signaling.

In a possible example, the processing unit 702 is configured to obtain, by means of the communication unit 703, the PDCP SN from a PDCP stratum entity through an access stratum (AS) entity; and query the preset mapping relationship using the PDCP SN as a query identifier, to determine the QoS flow ID corresponding to the PDCP SN.

In a possible example, the processing unit 702 is configured to transmit, by means of the communication unit 703, the preset mapping relationship through the RRC signaling.

Figure 7B:
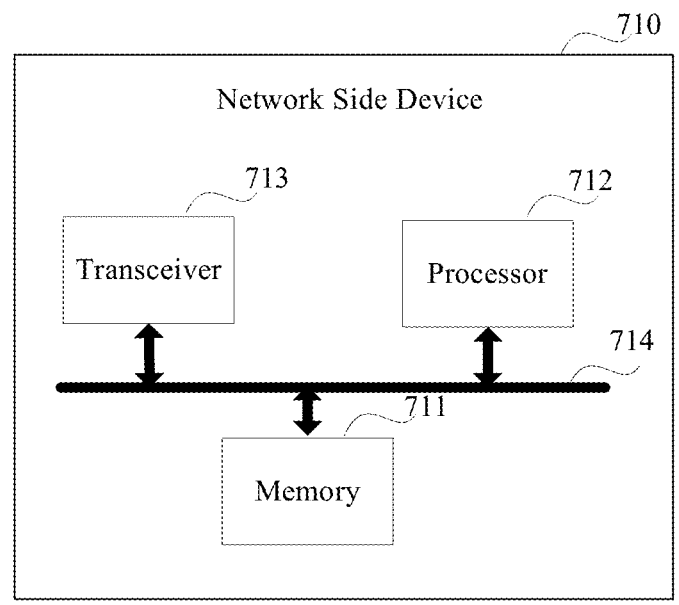
FIG. 7B is a block diagram illustrating another network side device according to an embodiment of the present disclosure.

When the processing unit 702 is a processor, the communication unit 703 is a communication interface, and the storage unit 701 is a memory, the network side device, involved in the embodiment of the present disclosure, may be the network side device shown in FIG. 7B.

Referring to FIG. 7B, the network side device 710 includes a processor 712, a communication interface 713, and a memory 711. Optionally, the network side device 710 may further include a bus 714. The communication interface 713, the processor 712 and the memory 711 may be connected to each other through a bus 714. The bus 714 may be a Peripheral Component Interconnect (PCI) bus or an Extended Industry Standard Architecture (EISA) bus and so on. The bus 714 can be categorized into an address bus, a data bus, a control bus and the like. For ease of representation, only one thick line is shown in FIG. 7B, but it does not mean that there is only one bus or one type of bus.

The network side device shown in FIG. 7A or FIG. 7B can also be understood as a device for the network side device, which is not limited in the embodiment of the present disclosure.

The embodiment of the disclosure further provides a communication system, which includes the above terminal and network side device.

Figure 8:
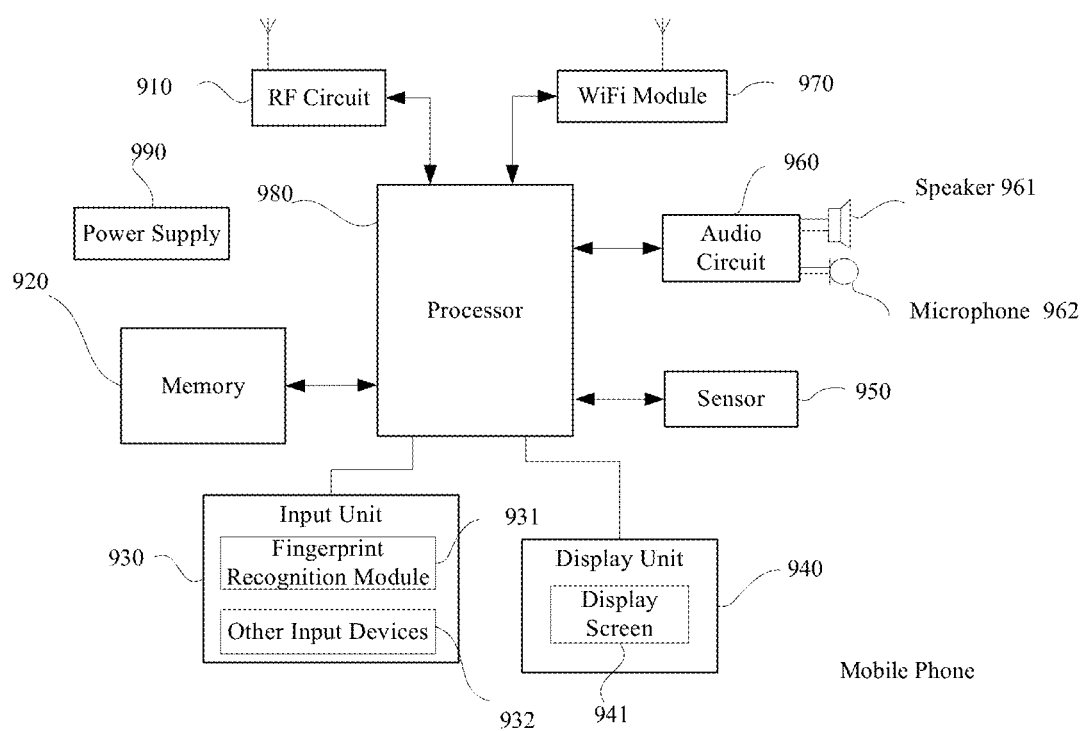
FIG. 8 is a block diagram illustrating another terminal according to an embodiment of the present disclosure.

The embodiment of the present disclosure further provides another terminal. As shown in FIG. 8, for the convenience of description, only parts related to the embodiment of the present disclosure are shown. If the specific technical details are not disclosed, please refer to the method part of the embodiment of the present disclosure. The terminal may be a mobile phone, a tablet computer, a Personal Digital Assistant (PDA), a Point of Sales (POS), an in-vehicle computer or the like, and a mobile phone, as the terminal, is taken as an example.

FIG. 8 is a block diagram showing a partial structure of a mobile phone related to a terminal provided by an embodiment of the present disclosure. Referring to FIG. 8, the mobile phone includes a Radio Frequency (RF) circuit 910, a memory 920, an input unit 930, a display unit 940, a sensor 950, an audio circuit 960, a Wireless Fidelity (WiFi) module 970, a processor 980 and a power supply 990 and other components. It will be understood by those skilled in the art that the structure of the mobile phone shown in FIG. 8 does not constitute a limitation to the mobile phone, and may include more or less components than those illustrated, or some components may be combined, or different component arrangements.

The specific components of the mobile phone will be specifically introduced below with reference to FIG. 8.

The RF circuit 910 can be used for receiving and transmitting information. Generally, the RF circuit 910 includes, but is not limited to, an antenna, at least one amplifier, a transceiver, a coupler, a Low Noise Amplifier (LNA), a duplexer and the like. In addition, the RF circuit 910 can also communicate with the network and other devices via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and the like.

The memory 920 can be used to store software programs and modules, and the processor 980 executes various functional applications and data processing of the mobile phone by running software programs and modules stored in the memory 920. The memory 920 may mainly include a storage program area and a storage data area, wherein the storage program area may store an operating system, an application required for at least one function and the like; the storage data area may store data created by usage of the mobile phone and the like. Moreover, the memory 920 can include high speed random access memory, and can also include non-volatile memory, such as at least one magnetic disk storage device, flash memory device or other volatile solid state storage device.

The input unit 930 can be configured to receive input numeric or character information and to generate key signal inputs related to user settings and function controls of the mobile phone. Specifically, the input unit 930 can include a fingerprint recognition module 931 and other input devices 932. The fingerprint recognition module 931 can collect fingerprint data of the user thereon. In addition to the fingerprint recognition module 931, the input unit 930 may also include other input devices 932. Specifically, other input devices 932 may include, but are not limited to, one or more of a touch screen, a physical keyboard, function keys (such as volume control buttons, switch buttons, etc.), trackballs, mice, joysticks and the like.

The display unit 940 can be used to display information inputted by the user or provide information to the user as well as various menus of the mobile phone. The display unit 940 can include a display screen 941. Optionally, the display screen 941 can be configured in the form of a Liquid Crystal Display (LCD), an Organic Light-Emitting Diode (OLED) or the like. Although in FIG. 8, the fingerprint recognition module 931 and the display screen 941 as two separate components to implement the input and input functions of the mobile phone, in some embodiments, the fingerprint recognition module 931 and the display screen 941 can be integrated and implemented to achieve the input and playback functions of the mobile phone.

The mobile phone may also include at least one type of sensor 950, such as a light sensor, motion sensor and other sensors. Specifically, the light sensor may include an ambient light sensor and a proximity sensor, wherein the ambient light sensor may adjust the brightness of the display screen 941 according to the brightness of the ambient light, and the proximity sensor may turn off the display screen 941 and/or backlight when the mobile phone moves to the ear. As a kind of motion sensor, the accelerometer sensor can detect the magnitude of acceleration in all directions (usually three axes). When it is stationary, it can detect the magnitude and direction of gravity. It can be used to identify the gesture of the mobile phone (such as horizontal and vertical screen switching, related game, magnetometer gesture calibration), vibration recognition related functions (such as pedometer, tapping), and the like. The mobile phone can also be provided with gyroscope, barometer, hygrometer, thermometer, infrared sensor and other sensors, and are not described here for brevity.

An audio circuit 960, a speaker 961, and a microphone 962 can provide an audio interface between the user and the mobile phone. The audio circuit 960 can convert the received audio data into an electrical signal, and transmit it to the speaker 961, and convert it into a sound signal for broadcast by the speaker 961; on the other hand, the microphone 962 converts the collected sound signal into an electrical signal by the audio circuit 960. It is converted to audio data after being received by the audio circuit 960, and it is processed by the audio data playback processor 980, and sent via the RF circuitry 910 to, for example, another mobile phone, or played back to the memory 920 for further processing.

WiFi is a short-range wireless transmission technology, and the mobile phone can help users to send and receive emails, browse web pages and access streaming media, etc., through the WiFi module 970, which provides users with wireless broadband Internet access. Although FIG. 8 shows the WiFi module 970, it can be understood that it does not belong to the essential configuration of the mobile phone, and may be omitted as needed within the scope of not changing the essence of the disclosure.

The processor 980 is the control center of the mobile phone, which connects various portions of the entire mobile phone using various interfaces and lines, by running or executing software programs and/or modules stored in the memory 920, and invoking data stored in the memory 920, executing the various functions and processing data of the mobile phone, so that the overall monitoring of the mobile phone is performed. Optionally, the processor 980 may include one or more processing units; preferably, the processor 980 may integrate an application processor and a modem processor, wherein the application processor mainly processes an operating system, a user interface, an application and the like. The modem processor primarily handles wireless communications. It will be appreciated that the above described modem processor may also not be integrated into the processor 980.

The mobile phone also includes the power supply 990 (such as a battery) for powering various components. Preferably, the power supply can be logically connected to the processor 980 through a power management system to manage functions such as charging, discharging, and power management through the power management system.

Although not shown, the mobile phone may further include a camera, a Bluetooth module and the like, and details are not described herein again.

In the foregoing embodiment shown in FIG. 4A and FIG. 5, the process on the terminal side in each step method may be implemented based on the structure of the mobile phone.

In the foregoing embodiments shown in FIG. 6A and FIG. 6B, each unit function can be implemented based on the structure of the mobile phone.

The steps of the method or algorithm described in the embodiments of the present disclosure may be implemented in a hardware manner, or may be implemented by a manner in which software instructions are executed by the processor. The software instructions may be composed of corresponding software modules, which may be stored in a Random Access Memory (RAM), a flash memory, a Read Only Memory (ROM), an Electrically EPROM (EPROM), Electrically EPROM (EEPROM), registers, hard disk, removable hard disk, compact disk read only (CD-ROM) or any other form of storage medium known in the art. An exemplary storage medium is coupled to the processor to enable the processor to read information from, and write information to, the storage medium. Of course, the storage medium can also be an part of the processor. The processor and the storage medium can be located in an ASIC. Additionally, the ASIC can be located in an access network device, a target network device or a core network device. Of course, the processor and the storage medium may also exist as a discrete component in the access network device, the target network device or the core network device.

Those skilled in the art should appreciate that in one or more of the above examples, the functions described in the embodiments of the present disclosure may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer can be a general purpose computer, a special purpose computer, a computer network or other programmable device. The computer instructions can be stored in a computer readable storage medium or transferred from one computer readable storage medium to another computer readable storage medium, for example, the computer instructions can be transmission from a website site, computer, server or data center to another website site, computer, server, or data center by wire (eg, coaxial cable, fiber optic, Digital Subscriber Line (DSL)) or wireless (eg, infrared, wireless, microwave, etc.). The computer readable storage medium can be any available medium that can be accessed by a computer or a data storage device such as a server, data center or the like that includes one or more available media. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)) etc.

The specific embodiments of the present disclosure have been described in detail with reference to the embodiments of the embodiments of the present disclosure. The scope of the present disclosure is defined by the scope of the present disclosure. Any modifications, equivalents, improvements, etc., which are included in the embodiments of the present disclosure, are included in the scope of the present disclosure.

What is claimed is:

1. An uplink data transmission method, comprising:
   transmitting, by a terminal, preset mapping relationship through RRC signaling to a network side device; and
   transmitting uplink data by the terminal, wherein, packet data convergence protocol sequence number (PDCP SN) of each data packet in the uplink data corresponds to a quality of service flow identification (QoS flow ID) in the preset mapping relationship, and none of the each data packet carries the QoS flow ID;
   wherein the preset mapping relationship is a correspondence between the PDCP SN of the each data packet and the QoS flow ID, and data in the data packet identified by the PDCP SN is derived from QoS flow identified by the QoS flow ID corresponding to the PDCP SN.

2. The method according to claim 1, wherein the QoS flow identified by the QoS flow ID in the preset mapping relationship is the QoS flow of data radio bear (DRB) mapped to the terminal.

3. The method according to claim 1, wherein the preset mapping relationship is determined by:
   a reflective mapping of QoS; or
   a flow mapping indicated by radio resource control (RRC) signaling.

4. The method according to claim 1, further comprising:
   obtaining, by the terminal, from an access stratum (AS) entity through a PDCP stratum entity, the QoS flow ID of the QoS flow of the DRB mapped to the terminal; and
   establishing, by the terminal, a correspondence between the PDCP SN of the data packet and the QoS flow ID to form the preset mapping relationship.

5. An uplink data transmission method, comprising:
   receiving, by a network side device, preset mapping relationship through RRC signaling from a terminal device; and
   receiving an uplink data by the network side device, wherein, packet data convergence protocol sequence number (PDCP SN) of each data packet in the uplink data corresponds to a quality of service flow identification (QoS flow ID) in the preset mapping relationship, and none of the each data packet carries the QoS flow ID;
   wherein the preset mapping relationship is a correspondence between the PDCP SN of the each data packet and the QoS flow ID, and data in the data packet identified by the PDCP SN is derived from QoS flow identified by the QoS flow ID corresponding to the PDCP SN.

6. The method according to claim 5, wherein the QoS flow identified by the QoS flow ID in the preset mapping relationship is the QoS flow of data radio bear (DRB) mapped to the terminal.

7. The method according to claim 5, wherein the preset mapping relationship is determined by:
   a reflective mapping of QoS; or
   a flow mapping indicated by radio resource control (RRC) signaling.

8. The method according to claim 5, further comprising:
   obtaining, by the network side device, the PDCP SN from a PDCP stratum entity through an access stratum (AS) entity; and
   querying, by the network side device, the preset mapping relationship using the PDCP SN as a query identifier, to determine the QoS flow ID corresponding to the PDCP SN.

9. A terminal, comprising a processor, a memory and a transceiver, wherein the processor is in communication with the memory and the transceiver;
   wherein the memory is configured to store program codes and data, and the processor is configured to invoke the program codes and the data in the memory to perform:
   transmitting preset mapping relationship through RRC signaling; and
   transmitting uplink data, wherein, packet data convergence protocol sequence number (PDCP SN) of each data packet in the uplink data corresponds to a quality of service flow identification (QoS flow ID) in the preset mapping relationship, and none of the each data packet carries the QoS flow ID;
   wherein the preset mapping relationship is a correspondence between the PDCP SN of the each data packet and the QoS flow ID, and data in the data packet identified by the PDCP SN is derived from QoS flow identified by the QoS flow ID corresponding to the PDCP SN.

10. The terminal according to claim 9, wherein the QoS flow identified by the QoS flow ID in the preset mapping relationship is the QoS flow of data radio bear (DRB) mapped to the terminal.

11. The terminal according to claim 9, wherein the preset mapping relationship is determined by:
   a reflective mapping of QoS; or
   a flow mapping indicated by radio resource control (RRC) signaling.

12. The terminal according to claim 9 wherein the processor is further configured to obtain, by means of the transceiver, from an access stratum (AS) entity through a PDCP stratum entity, the QoS flow ID of the QoS flow of the DRB mapped to the terminal; and establish a correspondence between the PDCP SN of the data packet and the QoS flow ID to form the preset mapping relationship.

* * * * *